(12) United States Patent
Algermissen et al.

(10) Patent No.: US 8,360,513 B2
(45) Date of Patent: Jan. 29, 2013

(54) WIND DEFLECTOR COMPRISING A LINEARLY OSCILLATING DEFLECTOR ELEMENT

(75) Inventors: Gerhard Algermissen, Köln (DE); Marion Algermissen, legal representative, Köln (DE); Engelbert Kusch, Salem (DE); Ludwig Schauwecker, Daisendorf (DE); Volker Schwarz, Eberbach (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 13/057,631

(22) PCT Filed: Aug. 5, 2009

(86) PCT No.: PCT/EP2009/005657
§ 371 (c)(1),
(2), (4) Date: Aug. 31, 2011

(87) PCT Pub. No.: WO2010/015389
PCT Pub. Date: Feb. 11, 2010

(65) Prior Publication Data
US 2012/0091752 A1    Apr. 19, 2012

(30) Foreign Application Priority Data

Aug. 7, 2008 (DE) .......................... 10 2008 036 887

(51) Int. Cl.
*B60J 7/22* (2006.01)
(52) U.S. Cl. ..................................... 296/217
(58) Field of Classification Search .................... 296/217
See application file for complete search history.

(56) References Cited

U.S. PATENT DOCUMENTS

| 4,492,406 | A | * | 1/1985 | Matsubara ................... 296/217 |
|---|---|---|---|---|
| 5,018,782 | A | * | 5/1991 | Fiegel et al. ................... 296/217 |
| 5,833,305 | A | * | 11/1998 | Watzlawick et al. .......... 296/217 |
| 6,174,025 | B1 | | 1/2001 | Henderson, III et al. |
| 6,357,823 | B1 | | 3/2002 | Birndorfer et al. |
| 6,626,486 | B2 | | 9/2003 | Lane |
| 6,644,729 | B2 | | 11/2003 | Sakai et al. |
| 2007/0040417 | A1 | | 2/2007 | Karami et al. |
| 2008/0157561 | A1 | | 7/2008 | Farber |

FOREIGN PATENT DOCUMENTS

| DE | 197 50 218 A1 | 5/1999 |
|---|---|---|
| DE | 199 58 742 A1 | 6/2001 |
| DE | 102 08 160 A1 | 10/2002 |
| DE | 101 42 047 A1 | 3/2003 |
| DE | 101 60 943 A1 | 6/2003 |

(Continued)

OTHER PUBLICATIONS

Corresponding International Search Report ( Form PCT/ISA/210) with English Translation, including Forms PCT/ISA/220, and PCT/ISA/237 (Thirteen (13) pages).

*Primary Examiner* — Dennis Pedder
(74) *Attorney, Agent, or Firm* — Crowell & Moring LLP

(57) ABSTRACT

A wind deflector for a vehicle is provided. The wind deflector includes a movably mounted deflector element and an actuator for moving the deflector element. The actuator can move the deflector element in a linearly oscillating manner in one direction in space, especially vertically. The linear movement can be performed regardless of a curvature of a class A surface of a vehicle.

13 Claims, 3 Drawing Sheets

FOREIGN PATENT DOCUMENTS

Figure 1:
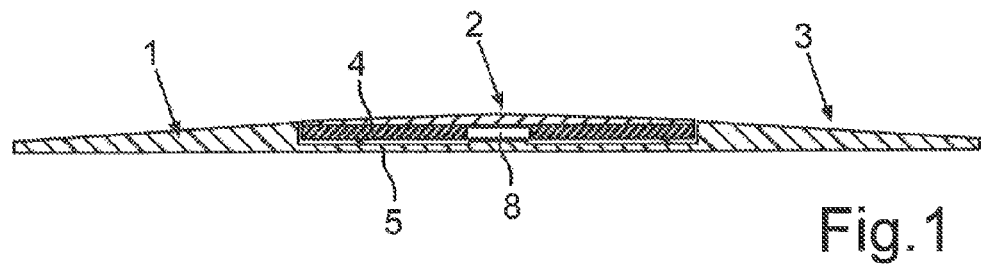

| | | | |
|---|---|---|---|
| DE | 20 2004 020 599 U1 | 10/2005 |
| DE | 10 2006 015 943 B3 | 2/2007 |
| DE | 102005059605 * | 7/2007 |
| EP | 1 514 715 A1 | 3/2005 |
| EP | 1 518 733 A2 | 3/2005 |
| JP | 2005-96646 A | 4/2005 |
| WO | WO 2006/069556 A1 | 7/2006 |

* cited by examiner

WIND DEFLECTOR COMPRISING A LINEARLY OSCILLATING DEFLECTOR ELEMENT

CROSS-REFERENCE TO RELATED APPLICATIONS

The present application is a national stage of PCT International Application No. PCT/EP2009/005657, filed Aug. 5, 2009, and claims priority under 35 U.S.C. §119 to German Patent Application No. 10 2008 036 887.3, filed Aug. 7, 2008, the entire disclosures of these documents are herein expressly incorporated by reference.

BACKGROUND AND SUMMARY OF THE INVENTION

The present invention relates to a wind deflector for a vehicle with a deflector element that is mounted in a movable manner, and an actuator for moving the deflector element. The present invention further relates to a vehicle with a sliding roof and such a deflector element.

Under certain conditions a periodic pressure fluctuation occurs with hollow spaces which air flows against. This can be a problem with all vehicles. Vehicles are hereby not only meant to be passenger motor vehicles and heavy goods vehicles, but also for example airplanes and trains.

The pressure fluctuations in passenger cabins are noticed by so-called "rumbling noises". These are extremely uncomfortable and disturbing for the passengers. So-called wind deflectors are, for example, often provided at the sliding roofs, which deflect the flow in such a manner that the pressure fluctuations in the passenger space are reduced. Rigid wind deflectors, however, only reduce the rumbling noises to a certain degree.

DE 197 50 218 C2 discloses a method for suppressing periodic pressure changes in a hollow space flown around by an outer flow and provided with a opening. A change of the flow direction of the outer flow opposed to current pressure change in the interior of the hollow space is effected periodically and in phase. Oscillating small deflecting wings are particularly used in phase for influencing the flow at the front edge of a roof section of a passenger motor vehicle. The wings deflect the flow at the upper roof side. Electric motors, piezo-ceramic actuators or electrodynamic actuators effect a deflection of the wings. A control cycle ensures that the deflection of the outer flow counteracts the pressure changes in the interior space.

It is disadvantageous with these wings that they have to be mounted to a curved axis, as the roof of a motor vehicle is usually curved. This curvature leads to problems with the wing movement.

Exemplary embodiments of the present invention are directed to a wind deflector that leads to reduced pressure fluctuations in a hollow space that is flown about, and which can be moved mechanically without problems.

This is achieved according to the invention by a wind deflector for a vehicle with a deflector element that is mounted in a movable manner and an actuator for moving the deflector element, wherein the deflector element can be moved in a linearly oscillating manner in one direction in space.

In an advantageous manner, the linear movement is independent of the curvature of the vehicle surface, and the deflector element can obtain the contour of the vehicle surface, so that optimum flow conditions can be achieved.

The wind deflector preferably has a center part and unmovable lateral parts, wherein the deflector element is arranged in a movable manner in the center part between the lateral parts. The movable deflector element in the center of the wind deflector is usually sufficient to achieve a high damping of the rumbling noises.

The center part can have a deflector base, to which the lateral parts are connected rigidly or in one piece, and on which the actuator is fastened. A relatively stable wind deflector can thereby be constructed.

According to a further embodiment, two hinge arms can be arranged in such a manner that they form a four bar hinge together with the deflector element and the deflector base. A stable movement amongst others orthogonally to the deflector base is thus possible with the deflector element.

Each of the two hinge arms can have a leaf spring. The four bar hinge is brought into a stable center position with these springs, around which the deflector element can oscillate.

Corresponding to an alternative embodiment, the wind deflector has a linear guide for the deflector element and a spring device for holding the deflector element in a basic position in the linear guide. An oscillating linear movement around a center position can also be realized hereby.

With this alternative embodiment, the spring device can comprise two spiral springs which are mounted to two opposite ends of the deflector element. The deflector element can be mounted symmetrically in a center position in this manner.

The actuator can be an electrodynamic actuator, whose elements can be moved in two orthogonal directions with regard to each other. The swinging movement of a four bar hinge can particularly be driven thereby.

According to a further embodiment, a further actuator can be present in addition to the actuator, and each of the actuators is connected to the end of the deflector element via a rocker. A mass balancing between the actuators and the deflector element can be achieved by this rocker construction. Accelerations introduced at the base thereby do not cause any relative movement of the deflector edge.

The deflector element can further have such a profile that a flow separation with regard to the inflow takes place at a rear edge. This has the advantage that smaller flow speeds occur at the deflector edge and flow swirls can hardly still impinge on the deflector element, whereby the noise disturbance by the air inflow is reduced further.

A vehicle with a sliding roof is provided according to a preferred embodiment, at which the above-described wind deflector is mounted. Rumbling noises in the passenger space can be reduced with it in a particularly effective manner.

BRIEF DESCRIPTION OF THE DRAWING FIGURES

Figure 2:
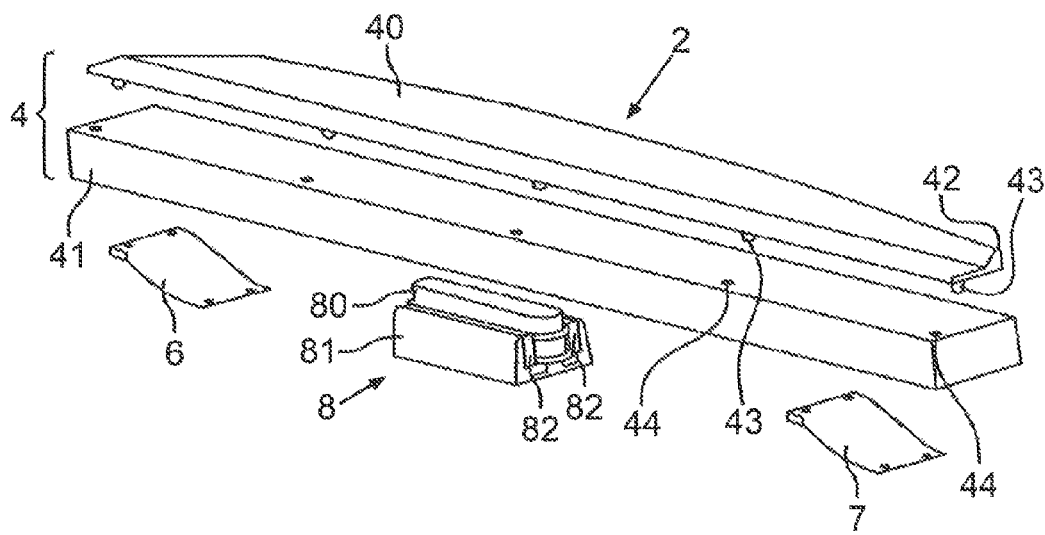
Figure 3:
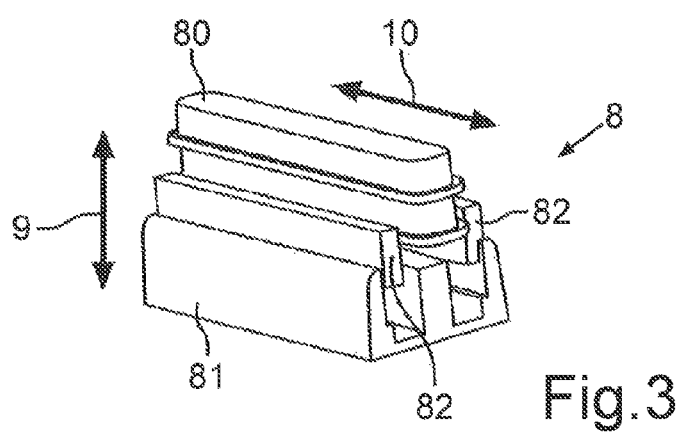
Figure 4:
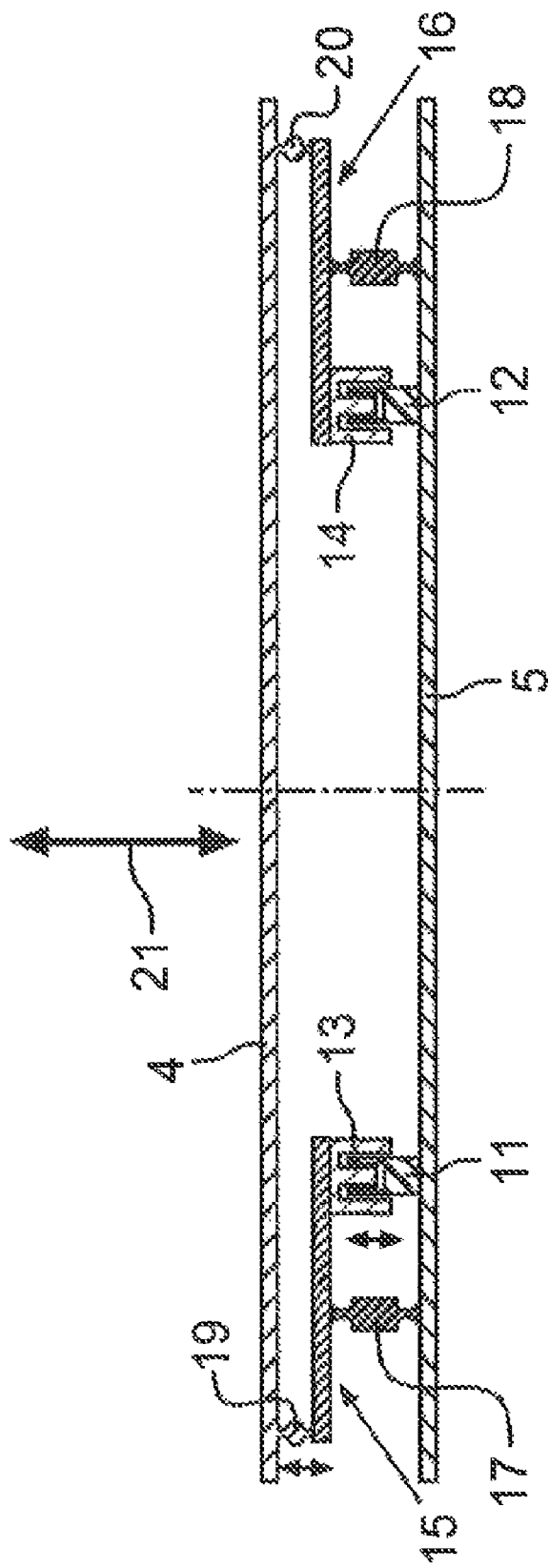
Figure 5:
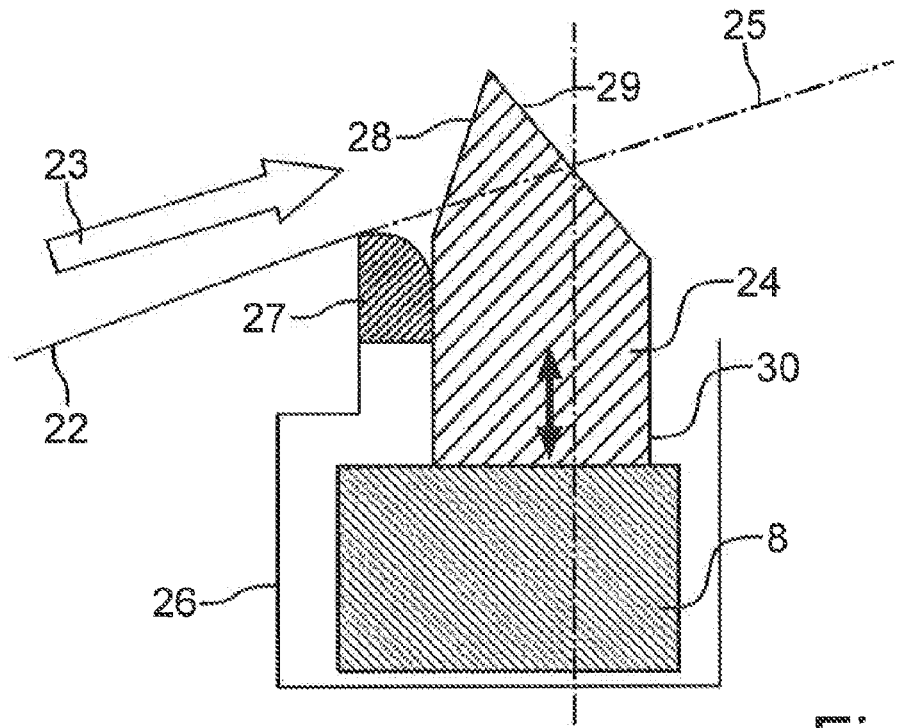
Figure 6:
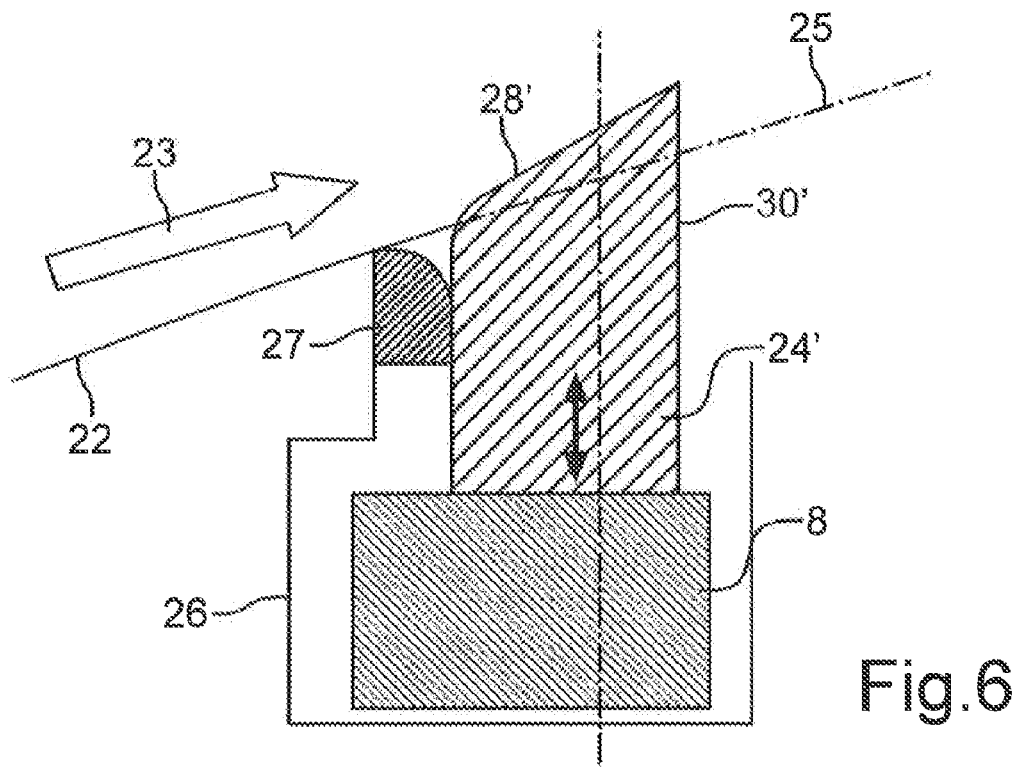

The present invention is now explained in more detail by means of the enclosed drawings, in which show:

FIG. 1 a section through an oscillating deflector according to the invention;

FIG. 2 an exploded view of the individual parts of the center part of the deflector of FIG. 1;

FIG. 3 the individual parts of the actuator of FIG. 1 and FIG. 2;

FIG. 4 a deflector with rigid solenoids and mass balancing according a further embodiment of the present invention;

FIG. 5 a cross section through the center part of the deflector of FIG. 1;

FIG. 6 a cross section through an alternative deflector.

DETAILED DESCRIPTION OF THE DRAWING FIGURES

The exemplary embodiments illustrated in more detail in the following represent preferred embodiments of the present invention.

FIG. 1 shows a wind deflector according to a first embodiment of the present invention. FIG. 1 shows the wind deflector in the view on the front edge of a sliding roof. The wind deflector is formed elongated and curved according to the contour of the vehicle roof. The entire wind deflector includes three parts, 1, 2 and 3. Only the upper edge or the upper section 4 or the center part 2 can oscillate. The two outer parts 1 and 3 function as a conventional deflector and at the same time as a stiffening of the base 5 of the entire deflector. The entire wind deflector is driven upwards by about 15 mm when opening the sliding roof, as is also the case with conventional wind deflectors.

FIG. 1 is shown the entire wind deflector in its longitudinal section. The individual parts of the center part 2 are represented in FIG. 2 in an exploded depiction. The upper section 4 of the center part 2 represents a deflector element and includes a deflector bar 40 and an upper arm 41 of a four bar hinge. The deflector bar 40 is adapted to the roof contour and has an edge 42 for the flow separation.

The deflector bar 40 is furthermore inserted into bores 44 of the upper arm 41 by means of corresponding pins 43. The deflector bar 40 can also be connected to the upper arm 41 in another manner or formed in one piece therewith.

The four bar hinge is formed by two leaf springs 6 and 7 in addition to the upper arm 41 and the deflector base 5 (not shown in FIG. 2). These two leaf springs 6 and 7 are, for example, screwed to the deflector base 5 and the upper arm 41. They proceed, for example, at an angle of 20° to the upper arm 41 or the base 5.

An electrodynamic actuator 8 engages the upper section 4 of the center part 2 for movements with respect to the deflector base 5. The electrodynamic actuator 8 has, as explained in more detail below in connection with FIG. 3, a solenoid 80 and an iron core 81 with magnets 82.

The four bar hinge defines the vertical center position of the deflector element or of the upper section 4 of the center part 2 and takes on the guide of the solenoid 80 in the iron core 81 with the magnets 82. It is additionally ensured by the four bar hinge that the deflector bar 40 always moves vertically parallel to the deflector base 5.

As an alternative to the leaf springs 6 and 7, the two lateral arms of the four bar hinge can also be formed as stiff arms with respectively one hinge at the end. A correspondingly another spring device can then be provided in order to hold the upper section 4 of the deflector center part 2 in a base position, around which it can oscillate.

FIG. 3 shows the electrodynamic actuator 8 in detail. It has an elongated iron core with an E-shaped profile. Permanent magnets 82 are arranged at the outer legs parallel to the longitudinal axis of the iron core 81. A solenoid body 80 can be moved between these permanent magnets 82 on or over the center leg of the E-shaped iron core essentially vertically to the longitudinal axis of the iron core 81 or of the solenoid body 80, namely in the vertical direction according to the double arrow 9. The movement is caused by the magnetic force which the two magnet components 80 on the one hand and 81 together with 82 on the other hand exert on each other.

The solenoid body 80 can additionally carry out movements according to the double arrow 10 along the longitudinal axis of the iron core 81 or the magnets 82. This lateral movement is caused by the parallel guidance by means of the four bar hinge.

The described arrangement with at least two magnets 82 in two parallel planes lateral of the solenoid 80, which permits movements of the solenoid 80 in the vertical and horizontal direction, can provide a particularly low and small construction. Constructions with a conventional loudspeaker solenoid are however also conceivable.

An alternative embodiment to the four bar hinge can, for example, be designed with two spiral springs at the left and right end of the upper section 4 of the deflector. Additional guide elements for the actuator 8 in the form of, for example, longitudinal links are then necessary.

A further advantageous embodiment of the oscillating wind deflector according to the invention is shown in FIG. 4. This wind deflector can also be formed in three parts with an oscillating center part and rigid outer parts according to FIGS. 1 and 2. The wind deflector can alternatively also oscillate over the entire length. This is valid for the embodiment according to FIG. 4 and for the embodiment according to FIGS. 1 and 2.

The deflector has two solenoids 11 and 12, which are rigidly mounted on the base 5. The two solenoids 11 and 12 cooperate with iron cores 13, 14, which are provided with permanent magnets as the actuator of FIG. 3. The iron cores 13 and 14 are respectively suspended on a rocker 15, 16 in a floating manner. The rockers 15 and 16 are respectively supported on the base 5 via a stabilizer link 17, 18. The end of each rocker 15, 16 respectively opposite the iron core 13, 14 is connected to one of the ends of the upper part 4 of the oscillating deflector or the deflector edge via a spring hinge or a stabilizer link 19, 20.

If the iron cores 13 and 14 carry out oscillating movements essentially vertical to the base 5, the other ends of the rockers 15 and 16 oscillate in a mirror-inverted manner. Their rocking movement is then transferred directly to the upper part 4 of the deflector via the stabilizer links 19 and 20, so that this also oscillates vertical or perpendicular to the base according to the arrow 21.

A mass balancing with regard to the upper part 4 can be achieved by the rockers 15 and 16, to which are also mounted the iron cores 13 and 14 in addition to the upper part 4 of the deflector. This has the advantage that vertical vehicle accelerations at the base of the deflector do not have any influence on its function due to the balanced mass forces. Furthermore, a spring element, which defines the vertical center position of the deflector edge or of the oscillating upper part of the deflector, is not necessary. A further advantage of the embodiment according to FIG. 4 is that a simple current supply to the solenoids 11 and 12 is possible, as these are mounted rigidly to the base 5.

FIG. 5 shows a cross section through a wind deflector according to the invention, which is built into the roof 22 of a vehicle. The section proceeds in the flow direction 23 of the air. Here, the wind deflector suppresses rumbling noises with a sliding roof. The sliding roof is opened, which is why the oscillating deflector 24, whose profile is depicted here symbolically as a pentagon and essentially corresponds to the upper section 4 of the deflector of FIGS. 1 and 2, projects from the roof surface 25. Driven by the actuator 8, which is fastened in a groove 26 of the vehicle roof 22, the deflector 24 carries out an oscillating vertical movement, which can possibly also take place perpendicular to the roof surface 25. The deflector 24 is sealed with a seal 27 with regard to the groove 26 or the roof 22 against the inflow direction 23.

The profile of the deflector 24 is now essentially characterized by a front edge 28 and a rear edge 29. Air flows directly to the front edge 28, which thus faces the driving direction. The front edge 28 is furthermore arranged nearly vertical. The rear edge 29 is inclined slightly forward with respect to the vertical rear side 30 of the lower part of the deflector. The flow separation takes place at the top of the front edge 28. This results in high flow speeds occurring at the separation edge and air swirls impinge the rear edge 29 and thereby also causing disturbing noises at least within low limits.

For the further reduction of the disturbing noises, an improved profile of the oscillating wind deflector is provided. The construction of the entire wind deflector, built into a vehicle, essentially corresponds to the one of the construction of FIG. 5. The only difference consists in the deflector 24' and in particular in its cross sectional profile. In the embodiment according to FIG. 6, the front edge 28' is drawn very flat to the rear and is only slightly steeper than the roof surface 25. The front edge 28' additionally proceeds up to the vertical rear side 30' of the deflector 24'. The rear edge is thereby formed by the rear side 30'. The flow separation thus takes place at the rear edge or rear side 30' of the deflector 24'. The flow swirls, however, do not impinge on the deflector itself, so that they cannot cause any further disturbing noises. Due to the largely undisturbed inflow and the flow separation at the rear edge, best results are thus achieved for rumbling suppression, inner noise and keeping free from draft.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A wind deflector for a vehicle, the wind deflector comprising:
    a deflector element moveably mounted on the vehicle, the deflector element arranged to move between a stored position and a deployed position; and
    an actuator coupled to the deflector element in such a manner that when the deflector element is in the deployed position the actuator causes the deflector element to linearly oscillate in one direction in space.

2. The wind deflector according to claim 1, wherein the wind deflector has a center part and immovable lateral parts, wherein the deflector element is arranged in a movable manner in the center part between the lateral parts.

3. The wind deflector according to claim 2, wherein the center part has a deflector base with which the immovable lateral parts are connected in a rigid manner or in one piece, and on which the actuator is fastened.

4. The wind deflector according to claim 3, comprising:
    two hinge arms arranged to form a four bar hinge together with the deflector element and the deflector base.

5. The wind deflector according to claim 4, wherein each of the two hinge arms has a leaf spring.

6. The wind deflector according to claim 1, comprising:
    a linear guide for the deflector element; and
    a spring device for holding the deflector element in a basic position in the linear guide.

7. The wind deflector according to claim 6, wherein the spring device comprises two spiral springs mounted at two opposite ends of the deflector element.

8. The wind deflector according to claim 1, wherein the actuator is an electrodynamic actuator with elements moveable with regard to each other in two orthogonal directions.

9. The wind deflector according to claim 1, comprising:
    a further actuator next to the actuator, wherein each of the actuators is respectively connected to one end of the deflector element via a rocker.

10. The wind deflector according to claim 1, wherein the deflector element has a profile such that a flow separation takes place related to the inflow at a rear edge.

11. A vehicle with a sliding roof, the vehicle comprising:
    a sliding roof; and
    a wind deflector mounted to the sliding roof, the wind deflector comprising
        a deflector element moveably mounted on the vehicle, the deflector element arranged to move between a stored and deployed position; and
        an actuator coupled to the deflector element se in such a manner that when the deflector element is in the deployed position the actuator causes the deflector element to linearly oscillate in one direction in space.

12. A method for wind deflector of a vehicle, the wind deflector comprising a deflector element moveably mounted on the vehicle and an actuator coupled to the deflector element, the method comprising:
    moving the deflector element from a stored position to a deployed position; and
    moving, by the actuator, the deflector element in such a manner that when the deflector element is in the deployed position the actuator causes the deflector element to linearly oscillate.

13. The method of claim 12, wherein the actuator is an electrodynamic actuator with elements moveable with regard to each other in two orthogonal directions.

* * * * *